United States Patent
Tarrida Tirado et al.

(10) Patent No.: US 9,039,812 B2
(45) Date of Patent: May 26, 2015

(54) EXHAUST SUBSTANCE REMOVAL (71) Applicant: HEWLETT-PACKARD DEVELOPMENT COMPANY, L.P., Houston, TX (US)

(72) Inventors: Francesc Tarrida Tirado, Canet de Mar (ES); Xavier Gasso Puchal, Barcelona (ES); Macia Sole Pons, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 56 days.

(21) Appl. No.: 13/931,452

(22) Filed: Jun. 28, 2013

(65) Prior Publication Data

US 2015/0000526 A1    Jan. 1, 2015

(51) Int. Cl.
    *B01D 5/00*    (2006.01)
    *B41J 29/377*    (2006.01)
    *B01D 46/00*    (2006.01)
    *B41F 35/00*    (2006.01)
    *B41J 29/17*    (2006.01)

(52) U.S. Cl.
CPC .......... *B01D 46/0031* (2013.01); *B01D 5/0072* (2013.01); *B41J 29/377* (2013.01); *B41F 35/00* (2013.01); *B41J 29/17* (2013.01)

(58) Field of Classification Search
USPC ............... 55/385.1, 429, 323, 329, 392, 467; 95/284; 399/93; 355/30, 200, 215; 454/49
See application file for complete search history.

(56) References Cited

U.S. PATENT DOCUMENTS

| | | | | |
|---|---|---|---|---|
| 3,680,528 | A * | 8/1972 | Sanders | 118/50 |
| 4,620,858 | A * | 11/1986 | Bradshaw et al. | 96/242 |
| 5,406,316 | A | 4/1995 | Schweibert et al. | |
| 5,424,806 | A * | 6/1995 | Siegel | 399/1 |
| 5,519,420 | A * | 5/1996 | Zorn et al. | 347/25 |
| 6,984,252 | B2 * | 1/2006 | Tanimoto | 55/385.1 |
| 7,468,099 | B2 * | 12/2008 | Katayama | 96/135 |
| 7,892,330 | B2 * | 2/2011 | Kusunoki | 96/156 |
| 7,934,791 | B2 | 5/2011 | Masuyama et al. | |
| 8,811,851 | B2 * | 8/2014 | Otsuka et al. | 399/93 |
| 2003/0235635 | A1 * | 12/2003 | Fong et al. | 425/73 |
| 2006/0096121 | A1 | 5/2006 | Nagashima | |
| 2009/0056291 | A1 * | 3/2009 | Van Niekerk | 55/385.1 |
| 2011/0164101 | A1 | 7/2011 | Saito et al. | |
| 2012/0183901 | A1 | 7/2012 | Mori et al. | |
| 2014/0069276 | A1 * | 3/2014 | Salathiel et al. | 95/284 |

OTHER PUBLICATIONS

Vondran, et al. Thermal Performance of Inkjet-Assisted Spray Cooling in a Closed System. Hewlett Packard Co. and Integrated Systems Development. 978-1-4244-9532-0/12 2012 IEEE.

* cited by examiner

*Primary Examiner* — Duane Smith
*Assistant Examiner* — Minh-Chau Pham (57) ABSTRACT

In one implementation, a substance removal apparatus may include a collection unit and a removal unit. The collection unit may have a structure forming a channel and an inlet to receive an exhaust from a print system. The removal unit may separate a substance from the exhaust and transfer heat from the exhaust to the print system. The removal unit may include a heat exchanger and an impaction mechanism.

19 Claims, 7 Drawing Sheets

EXHAUST SUBSTANCE REMOVAL

BACKGROUND

Print systems may commonly use a print material in a manipulable form to apply the print material to a print medium. For example, water-based inks may be sufficiently aqueous to deliver less than a microliter of ink to the print medium. Additives may be used to adjust the viscosity of the print material or otherwise improve manipulation of the print material. For example, latex print systems may utilize one or more solvents to soften the latex. Print processes may commonly produce heat during the print process, whether by design or as a side effect. The print system may produce heat during a print process to dry or cure the print material. For example, latex print systems may use heat to cure the latex material and/or remove a solvent from the print material after delivery of the print material to the print medium. Fluid and heat may circulate in the print system and/or may exit the print system.

DETAILED DESCRIPTION

In the following description and figures, some example implementations of substance removal apparatus, systems, and/or methods are described. Some examples of substance removal apparatus, systems, and/or methods are described specifically for use in a system for curing latex ink. However, it should be noted that examples of substance removal system described herein may be utilized in a wide variety of systems and applications. In particular, the substance removal system may be utilized in a printing environment that may produce a fluid, such as a gas or vapor, containing a substance while still complying with the principles disclosed herein. Therefore, latex printing is merely one of many potential uses of the substance removal apparatus and systems described herein. Thus any reference to latex printing and related subject matter is merely included to provide context for specific examples described herein. The disclosed apparatuses and systems may be applied to a variety of environments and implementations.

Recirculation curing models may use heat produced during a first print process in a second print process. For example, the heat used to cure ink to form an image on a medium may be circulated through the print system. Recirculation may increase electrical efficiency of the system by reusing the heat produced during each print process. Air external to the print system may be used to refresh circulated air inside the print system.

Latex inks may contain a low-volatile solvent, or multiple solvents, to act as a softener or otherwise keep the print material in a liquid form or otherwise manipulable state. The solvent(s) that may evaporate or otherwise create vapors during curing at a high temperature. The recirculated airflow may contain solvent vapors that may continue to increase in concentration as the air continues to recirculate during the curing process. Air external to the printer may be added as some recirculated air is exhausted out of the print system. The exhausted gas may be air and may contain other substances as a result of the print process. When the hot exhaust containing high concentrations of the solvent(s) cools to an ambient temperature, supersaturation may occur, the solvent(s) may condensate, and the solvent(s) may form airborne particles. The particles may be vented away from the print system to avoid condensations of the solvents in the print system.

Various embodiments described below were developed to remove a substance from an exhaust of a print system. In general, the exhaust may be collected, separated from the substance, and circulated to the print system and/or print environment. The exhaust may be a gas containing a substance capable of exiting the print system. The exhaust may be collected as close as possible to the print system to increase capture of the substance to be removed from the exhaust. The substance may be extracted from the exhaust by transferring heat and impacting the exhaust. The exhaust may be reusable in the print system, and heat may be transferred to the print system.

Figure 1:
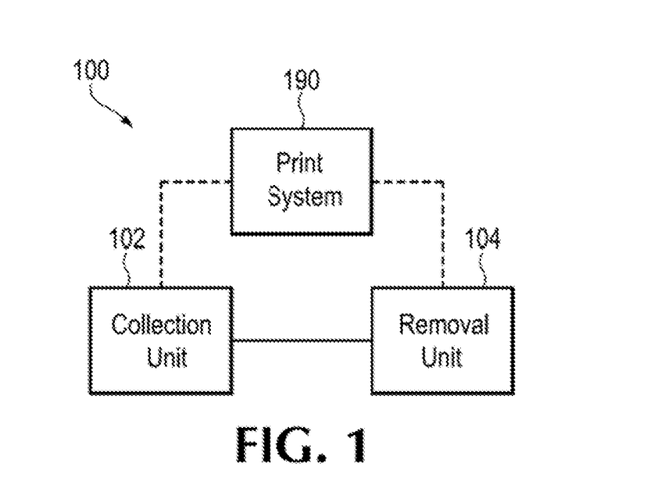
FIGS. 1 and 2 are block diagrams of examples of a substance removal system.
Figure 2:
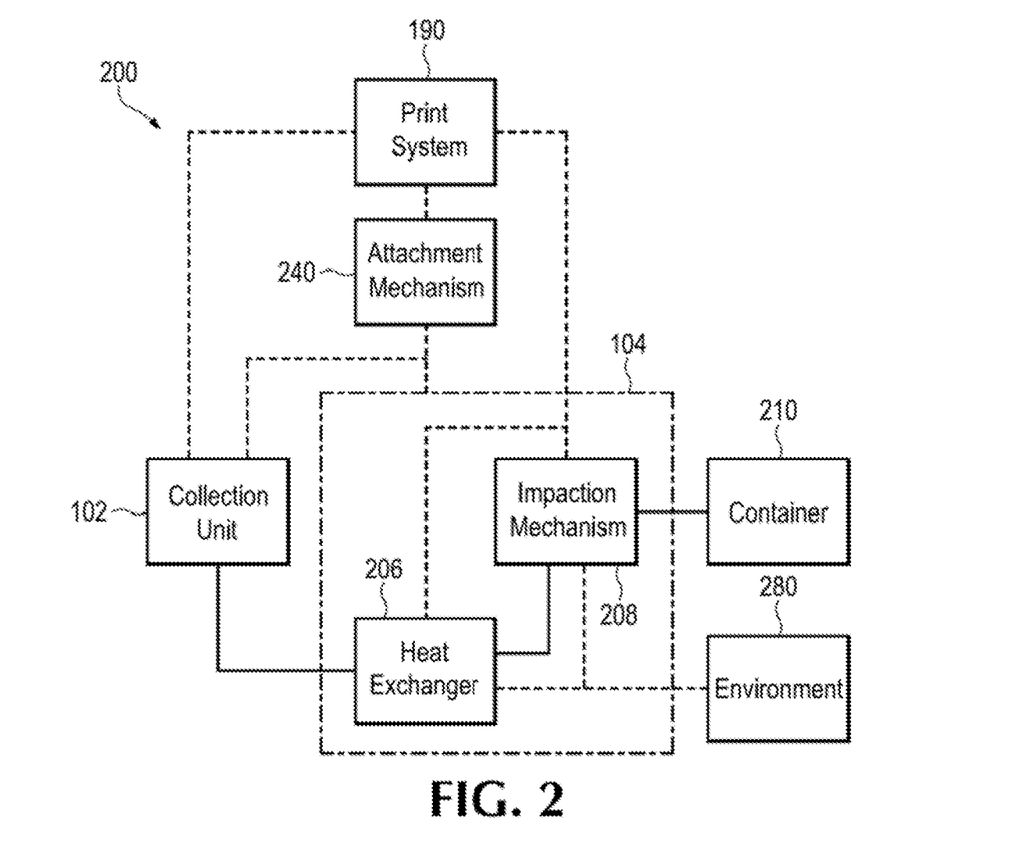

FIGS. 1 and 2 are block diagrams of examples of a substance removal system. Referring to FIG. 1, an example substance removal apparatus 100 may generally comprise a collection unit 102 and a removal unit 104.

The substance removal apparatus 100 may be operatively coupled to a print system 190. The print system 190 may produce exhaust as a result of a print process performed by the print system 190. For example, the print system 190 may produce hot air during a curing process. The exhaust may be any gas at any temperature operable with the print system 190. For example, the exhaust may be air and the temperature may greater than the dew point of water in the print environment. The exhaust may include a substance as a result of the print process. For example in latex printing, the print process may heat an ink containing a solvent and may produce vapors of the solvent mixed with the gas within the print system and/or vent from the print system with the hot gas. The exhaust in that example may be hot air containing solvent vapors.

The collection unit 102 may be operatively coupled to the print system 190 to receive the exhaust, including both a gas and a substance, from the print system 190. The collection unit 102 may have a structure forming a channel. A portion of the structure may form an inlet to receive an exhaust from the print system. As mentioned above, the exhaust may contain a substance. The portion of the structure forming the inlet may be placed as close as possible to the outlet of the print system 190 to catch as much of the exhaust as possible without interfering with the processes of the print system.

The removal unit 104 may be operatively coupled to the collection unit 102. The removal unit 104 may be contained within the collection unit 102, directly coupled to the collection unit 102, or indirectly coupled to the collection unit 102. For example, the removal unit 104 may be coupled to the collection unit 102 through a manifold and/or tubing.

The removal unit 104 may separate the substance from the exhaust and transfer heat from the exhaust to the print system 190. The exhaust may be reusable in the print system 190; for example, the heat from the exhaust may be used to heat the print system 190. The substance may be extracted from the exhaust to maintain operability of the print system 190 while using the exhaust in the print system 190. For example, the exhaust that contains solvent vapors may build up on mechanisms of the print system 190 whereas the exhaust without solvent vapors may be used in a similar fashion as external air.

The removal unit 104 may be generally configured to transfer heat from the exhaust. The removal unit 104 may transfer heat by conduction, convection, radiation, advection, or phase change of the exhaust. The heat of the exhaust may be transferred to the print system 190 to use during operations of the print system 190. For example, the latex curing environment may use the heat during the curing process. Reusing heat may reduce energy cost and/or maintain the operation environment of the print system 190.

Referring to FIG. 2, an example substance removal apparatus may generally comprise a collection unit 102 and a removal unit 104. The removal unit 104 may include a heat exchanger 206 and an impaction mechanism 208. The heat exchanger 206 may transfer heat from the exhaust to a gas and the impaction mechanism 208 may impact the exhaust and coalesce the substance. "Impacting the exhaust" may include allowing the exhaust to flow through the impaction mechanism 208 while the substance collides with and/or aggregates within the impaction mechanism 208.

The heat exchanger 206 may transfer heat from the exhaust to a gas. The heat exchanger 206 may condense the exhaust by transferring heat from the exhaust. The heat exchanger 206 may transfer heat through a transfer medium between the exhaust and the gas or by direct contact between the exhaust and the gas. The gas and/or the exhaust may be guided to the print system 190 or the environment 280. The environment 280 may be outside the print system 190.

The heat exchanger 206 may guide the exhaust and the gas in a parallel-flow, a counter-flow, or a cross-flow in accordance with implementation. For example, the heat exchanger 206 may provide horizontal channels for the exhaust and vertical channels for the gas for a cross-flow implementation. The heat exchanger 206 may be a passive heat exchanger or an active heat exchanger. The passive heat exchanger may use external gas at the temperature received whereas an active heat exchanger may use a system, such as heat transfer coils, to change the temperature of the external gas or the exhaust prior to the heat exchange. For example, a passive heat exchanger may use air at an ambient temperature of the room housing the print system whereas an active heat exchanger may cool the exhaust before transferring heat from the exhaust to the air. An active heat exchanger may include an active heat transferring system, such as cooling system using a liquid interface. A passive heat exchanger may adapt to heat requirements of the system by adding an active heat transferring system at the cost of increased energy. A passive heat exchanger may condensate the exhaust sufficiently at an ambient temperature without the energy cost of an active heat exchanger.

The impaction mechanism 208 may be operatively coupled to the heat exchanger 206. The impaction mechanism 208 may coalesce, gather, or otherwise collect the substance. For example, the exhaust that is discharged from the heat exchanger 206 may flow to the impaction mechanism 208 where the impaction mechanism 208 may guide the exhaust to contact a collection surface within the impaction mechanism 208. The impaction mechanism 208 may include a collection surface having a plurality of threaded fibers to form a mesh. The collection surface may be adapted in accordance with the particle size and/or viscosity of the substance. For example, the impaction mechanism 208 may be a demister having a mesh density based on at least one of a particle size of the substance and a viscosity of the substance. Mesh density may be the quantity and/or spacing of threaded fibers within the impaction mechanism 208. The impaction mechanism 208 may coalesce the substance into a form that may be collectable, such as droplets. The impaction mechanism 208 may guide the exhaust to the print system 190 or the environment 280.

A container 210 may be coupled to the removal unit 104 to collect the substance. For example, the substance may be a solvent that has coalesced to a collectable form and/or size that the collected solvent may funnel, possibly through a mechanism, to the container 210 or drop into the container 210 directly from the impaction mechanism 208.

The collection unit 102 and/or the removal unit 104 may be attachable to the print system 190 by an attachment mechanism 240. For example, an attachment mechanism 240 may be coupled to the collection unit 102 to attach the collection unit 102 to the print system 190. The attachment mechanism 240 may align the portion of the structure of the collection unit 102 forming an inlet with a portion of the print system 190 that forms an outlet for the exhaust to flow from the outlet to the inlet.

Figure 3:
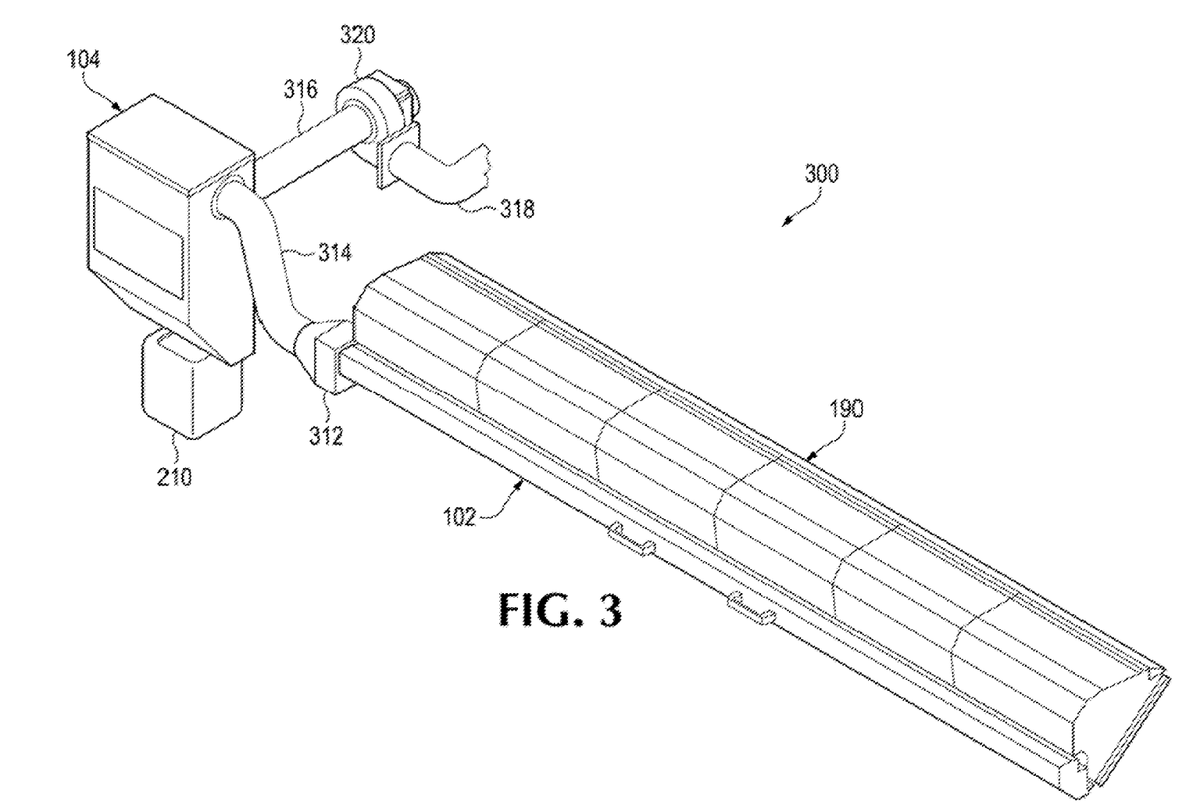
FIGS. 3, 4 and 5 are perspective views of examples of a substance removal system.
Figure 4:
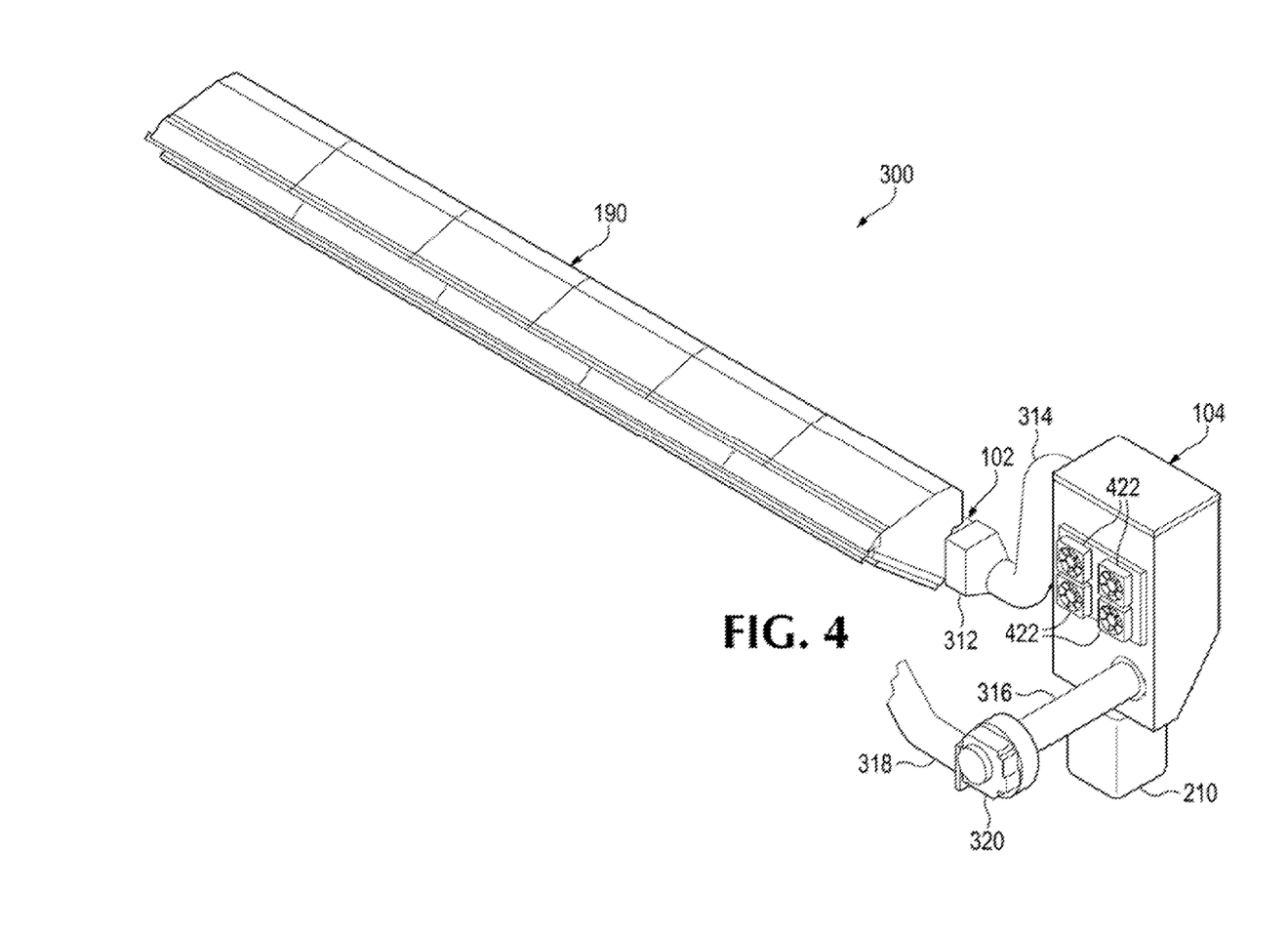
Figure 5:
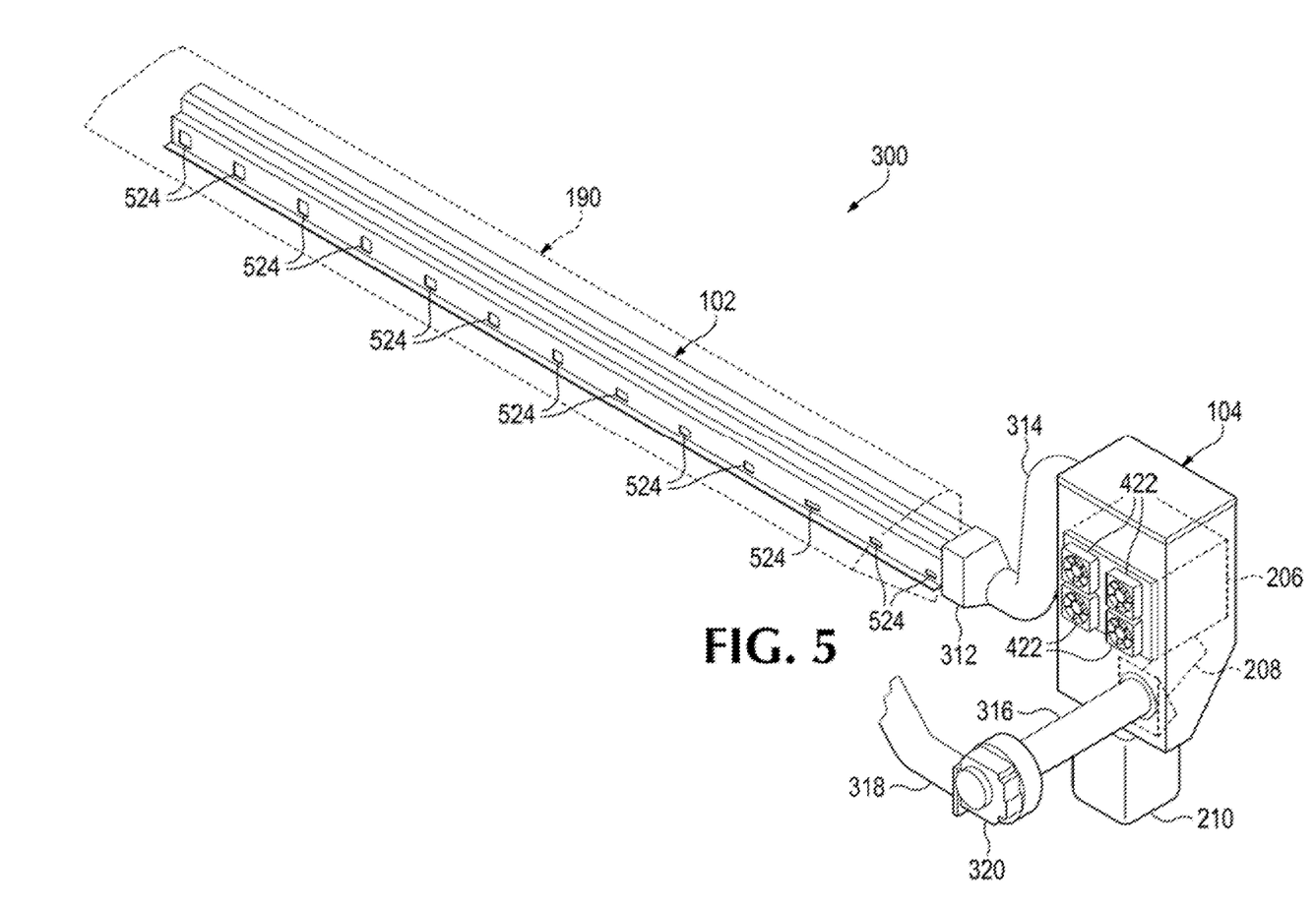

FIGS. 3, 4, and 5 are perspective views of examples of a substance removal system 300. Referring to FIGS. 3, 4, and 5, the example substance removal system 300 may generally comprise a print system 190, a collection unit 102, a heat exchanger 206, and an impaction mechanism 208. Exhaust from the print system 190 may enter the collection unit 102 and flow through a tubing 314 to the removal unit 104 to remove a substance from the exhaust and transfer heat to the print system 190. The heat exchanger 206 and the impaction mechanism 208 may constitute components of the removal unit 104.

The print system 190 may produce an exhaust having a substance, such as a solvent vapor. The exhaust may have a first temperature. The first temperature may be about the temperature used during a curing process in the print system 190 relative to the distance traveled to the outlet of the print system 190.

The print system 190 may comprise one or more mechanisms for applying a print material to a print medium. The print system 190 may guide a gas, such as air, through the print system 190. For example, the flow of the gas may circulate within the print system 190 and/or may divert a portion of the gas outside of the print system 190. A portion of the gas may be an exhaust that may vent from the print system 190. The exhaust may contain a substance. For example, the substance may be a solvent that may change phase to a vapor when heated to a temperature used for curing.

The collection unit 102 may be operatively coupled to the print system 190. The collection unit 102 may include a structure forming a channel to receive exhaust from the print system 190. A portion of the structure of the collection unit 102 may form a plurality of inlets 524 to receive exhaust from the print system 190. Each one of the plurality of inlets 524 may have a geometry based on at least one of a location of the each one of the plurality of inlets 524 and a flow rate of the exhaust received from the print system 190.

The collection unit 102 may receive the exhaust from the print system 190. As shown in FIG. 5, a portion of the structure of the collection unit 102 may form one or more inlets. The exhaust from the print system 140 may be received through the inlets into the collection unit 102. The collection unit 102 may guide the exhaust to the removal unit 104.

The portion of the structure of the collection unit 102 may form a plurality of inlets 524. Each one of the plurality of inlets may be positioned in relation to one or more points of exhaust on the print system. Each one of a plurality of inlets 524 may have a geometry based on at least one of a location of the each one of the plurality of inlets 524, a flow rate of the exhaust vented from the print system 190, and/or other characteristics of the print system 190 and/or the collection unit 102. For example, the geometries of the inlets 524 may be based on the rate at which the exhaust is received at each inlet 524 and/or the rate at which the print system 190 produces the exhaust. For another example, the geometries of the inlets 524 may be based on establishing about the same airflow ratio through each inlet 524 and/or equalizing the airflow within the collection unit 102.

The geometries of the inlets 524 may produce a homogenized airflow across the collection unit 102. For example, the geometries of the inlets 524 may compensate for a pressure drop between a proximate end of the collection unit 102 to a distal end of the collection unit 102. The geometry of the collection unit 102 may produce various amounts of back pressure along the collection unit 102. The geometries of the inlets 524 may compensate for the varying back pressures at each inlet 524 by having varying geometries. For example, if there is an approximately linear pressure drop along the collection unit 102 front to proximal end of the collection unit 102 to a distal end of the collection unit 102, each inlet 524 may grow in accordance from its distance from the proximal end. The pattern and geometries of the inlets 524 may be altered by evaluating the print system 190 based on airflow as well as other characteristics of the print system 190, such as load loses, turbulence, vapor leaks, etc. For example, each location of the plurality of inlets 524 may have a different back pressure along the collection unit 102 and the geometry may be adjusted accordingly.

A portion of the collection unit 102 may form an outlet. The exhaust may leave the collection unit 102 through the outlet. A manifold 312 may be connected to the outlet of the collection unit 102. The manifold 312 may connect a tubing 314 to the collection unit 102. The tubing 314 may connect to the removal unit 104. The tubing 314 may allow for customized positioning of the removal unit 104 in relation to the collection unit 102.

The removal unit 104 may transfer heat to between the exhaust and a gas. The gas, such as air, may be external to the print system 190. The removal unit 104 may have one or more gas movement devices 422 to provide flow of the gas through the removal unit. For example, the air outside the print system 190 may be channeled by a gas movement device 422 into the removal unit 104 to transfer the heat from the exhaust to the external air to cool and/or condense the exhaust. Alternatively, the gas movement device 422 may channel the external gas out of the removal unit 104, which may provide a current, such as a current 756 shown in FIG. 7. As shown in FIG. 5, the removal unit 104 may include a heat exchanger 206 to transfer heat and/or condense the exhaust. Also shown in FIG. 5, the removal unit 104 may include an impaction mechanism 208 to coalesce and/or gather the substance. The removal unit 104 may guide the substance to collect into a container 210.

The heat exchanger 206 may be operatively coupled to the collection unit 102 to receive the exhaust from the collection unit 102. The heat exchanger 206 may condense the exhaust by transferring heat to a gas at a second temperature. The second temperature may be cooler than the first temperature. The result may be the exhaust discharged from the heat exchanger 206 may be at a third temperature and the gas discharged from the heat exchanger may be at a fourth temperature. The heat exchanger 206 may exchange the heat from the exhaust to the gas to cause the exhaust to be at the third temperature that is less than the first temperature. The fourth temperature of the gas may be greater than the second temperature. The gas may follow a current and/or tubing back to the print system 190.

The heat exchanger 206 may remove the substance by condensing the exhaust. For example, the exhaust may condense and aggregate the substance vapors together; the substance may change phase and/or otherwise become heavier than the air and fall through the heat exchanger. The heat exchanger may be a passive heat exchanger or an active heat exchanger. For example, an active heat exchanger may include a cold source to reduce the temperature of the external gas.

The impaction mechanism 208 may be operatively coupled to the heat exchanger 206 to receive a portion of the exhaust discharged from the heat exchanger 206. The impaction mechanism 208 may have a collection surface, such as a filter, to remove a substance from an airflow or current. The impaction mechanism 208 may include a demister. The demister may have a mesh density based on at least one of a particle size of the substance and a viscosity of the substance. For example, the threaded fibers of the demister may be close enough together that the substance may collide with one or more of the threaded fibers and aggregate as the substance moves through the demister. The demister may provide impaction using gravity and the substance may flow and/or divert to a container 210. For example, inertia from gravity may assist solvent drops through the demister to aggregate and collect in a container 210 below the demister.

A gas movement system 320 may be operatively coupled to at least one of the collection unit 102 and the heat exchanger 206. The gas movement system 320 may provide a current of the exhaust through at least one of the collection unit 102, the heat exchanger 206, and a second channel 318 to the print system 190. For example, the gas movement system 320 may provide a current 758 shown in FIG. 7. The gas movement system 320 may be a vacuum pump to facilitate airflow, or current, through the substance removal system 300.

Figure 6:
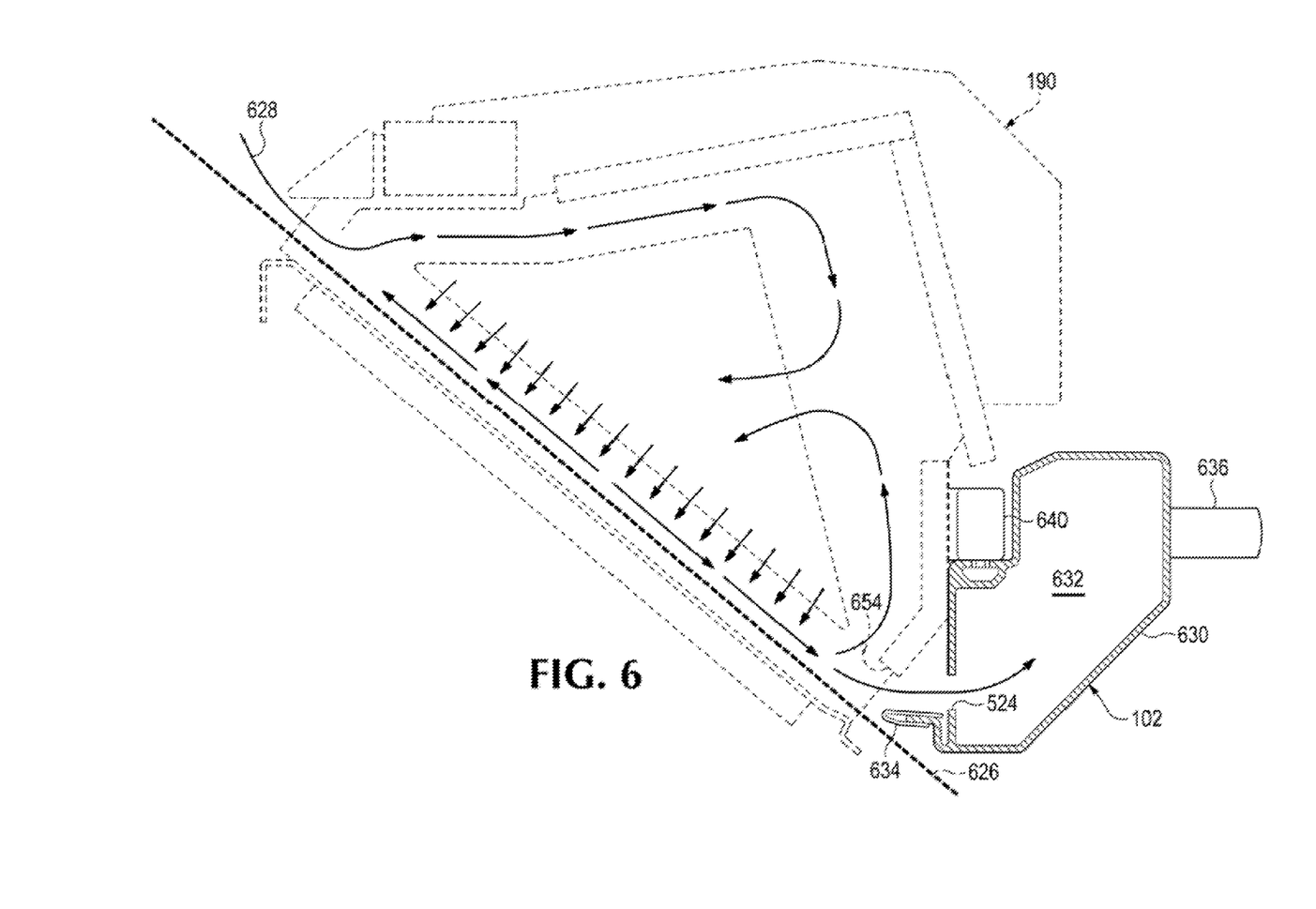
FIG. 6 is a cross-sectional view of an example print system and an example collection unit of a substance removal system.

FIG. 6 is a cross-sectional view of example components of a substance removal system. Referring to FIG. 6, a collection unit 102 may be operatively coupled to the print system 190. The collection unit 102 may receive an exhaust from the print system 190.

The print system 190 may circulate a gas, such as air, through the print system 190 to provide a current 628. The print system 190 may heat the gas and channel the gas over the print medium 626 to heat the print material and/or print medium 626. The heat from the gas may cure, dry, or otherwise change the print material on the print medium 626. The print material may be changed by removing a substance of the material or by changing the phase of the print material. Removing a substance, such as water or a solvent, from the print material or otherwise changing the phase of the print material may increase the resistance of the print material. For example, the heat may remove the solvents in the latex print material to enable the latex print material to harden.

The print system 190 may vent exhaust in relation to the current 628, or airflow, within the print system 190. For example, the current 628 may follow a channel for feeding the print medium 626 through the print system 190. As another example, the current 628 may circulate through the print system 190. The current 628 may divert part of the exhaust out of the print system 190 through an outlet 654. The exhaust may contain a substance. The substance may move with the exhaust through the current 628 of the print system 190. A portion of the current of the print system 190 may exit the print system 190 at an outlet 654 on the print system 190. For example, the substance may follow as recirculating airflow 628 within the print system 100 and may exit the print system 190 where the print medium 626 is fed out of the print system 190 at an outlet 654.

The structure 630 of the collection unit 102 may form a channel 632. A portion of the structure 630 may form one or more inlets 524 to receive the exhaust from the print system 190. The portion of the current 628 that exits the print system 190 may flow into the channel 632 of the collection unit 102. The channel 632 may guide the exhaust from the inlet 524 to the removal unit.

A lip 634 may be coupled to the collection unit 102 and the lip 634 may divert the exhaust from the print system 190 to the plurality of inlets 524 of the collection unit 102. A lip 634 may be useful in implementations where the collection unit 102 is attachable to the print system 190 as an after-market or accessory product. The lip 634 may reduce a gap between the plurality of inlets 524 of the collection unit 102 and an outlet 654 of the print system 190.

An attachment mechanism 640 may be coupled to the collection unit 102. For example, the attachment mechanism 640 may be fastened to the collection unit 102. As another example, a portion of the attachment mechanism 640 may be integrated into the structure 630 of the collection unit 102. The attachment mechanism 640 may attach the collection unit 102 to the print system 190. The attachment mechanism 640 may align the portion of the structure 630 of the collection unit 102 forming a plurality of inlets 524 with a portion of the print system 190 forming an outlet 654.

A handle 636 may be attached to the collection unit 102. The handle 636 may assist attachment and detachment of the collection unit 102 from the print system 190.

Figure 7:
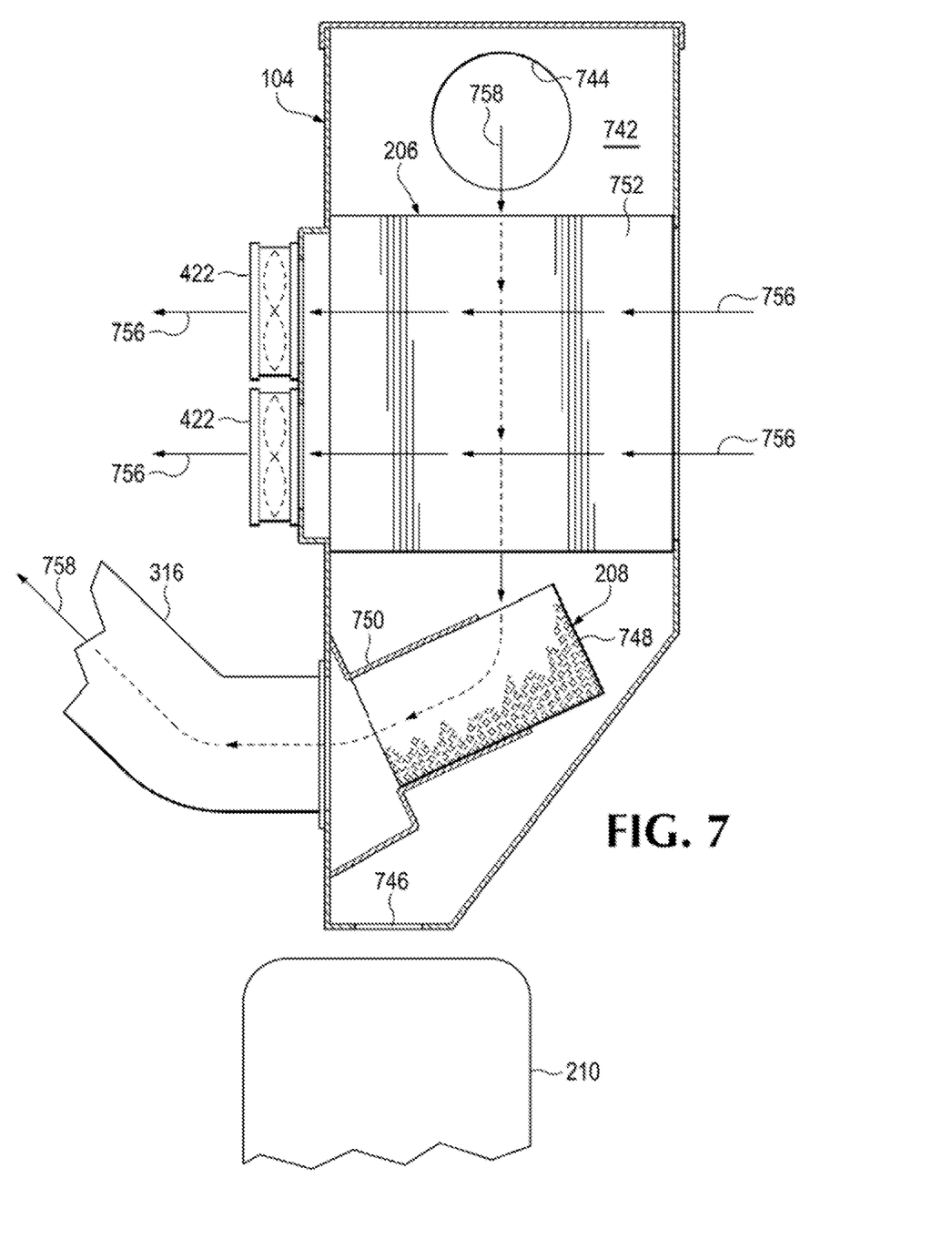
FIG. 7 is a side view of an example removal unit of a substance removal system.

FIG. 7 is a side view of example components of a substance removal system. Referring to FIG. 7, a removal unit 104 may generally comprise a heat exchanger 206 and an impaction mechanism 208.

The removal unit 104 may receive an exhaust containing a substance. The removal unit 104 may have a panel 742. A portion of the panel 742 may form an inlet 744. The heat exchanger 206 may receive the exhaust from the inlet 744. A current 758 may provide a flow from the inlet 744 through the heat exchanger 206, to the impaction mechanism 208, and/or through tubing 316. The tubing 316 may guide the exhaust to the print system 190 or the environment 280.

The heat exchanger 206 may be a passive heat exchanger or an active heat exchanger. The removal unit 104 may contain an active cooling system if the heat exchanger 206 is an active heat exchanger. A passive heat exchanger may provide sufficient efficiency for removing the substance without the energy cost to actively cool the exhaust.

The heat exchanger 206 may receive the exhaust at a point of entry of the heat exchanger 206. For example, there may be a point of entry on the top of the heat exchanger 206, as shown in FIG. 7. The exhaust may flow between plates located within the heat exchanger, such as plate 752. The plates 752 may form channels and guide the current 758 through the heat exchanger 206. Heat may transfer from the exhaust to one or more plates 752. The plates 752 may have a surface area based on at least one of a temperature of the exhaust, a determined amount of heat transferred, and a resistance time to cool to a determined temperature. The geometry of the plates 752 may be sufficient to cool the exhaust to an ambient temperature, or other determined temperature, and condense the exhaust to a size collectable by the impaction mechanism 208 in one pass through the heat exchanger 206. The plates 752 may be made of a material capable of transferring heat and dividing the currents 756 and 758 in the heat exchanger 206. For example, the plates 752 may be made of aluminum.

The heat exchanger 206 may include a gas movement device 422, such as a fan, to provide a second current 756 through the heat exchanger 206. Gas, such as air, may flow through the heat exchanger 206 following the second current 756. The gas may be external to the print system 190. The gas may have a temperature different from the exhaust. For example, the gas may be at an ambient temperature, such as room temperature. The heat transferred from the exhaust to the plate 752 of the heat exchanger 206 may transfer to the gas to increase the temperature of the gas.

The second current 756 may exist in the heat exchanger 206 in relation to the current 758. In a cross-flow heat exchanger, as shown in FIG. 7, there may be a second current 756 perpendicular or oblique to the first current 758. If the heat exchanger 206 was a parallel-flow or a counter-flow heat exchanger, than the first current 756 may have a parallel or counter relationship, respectively, to the second current 758. The current 756 may flow from the heat exchanger 206 to the print system 190.

As shown in FIG. 7, the heat exchanger 206 may be a passive plate cross-flow heat exchanger. There may be multiple plates parallel to plate 752 shown in FIG. 7 to form and/or divide channels within the heat exchanger 206. The first current 758 may flow on one side of plate 752 while the second current 756 may flow on the other side of the plate 752. For example in the perspective of FIG. 7, the exhaust may follow the first current 758 and flow behind the plate 752, while external air at the ambient temperature may follow the second current 756 and flow in front of the plate 752. The plates 752 may separate flows of gas and/or exhaust through the heat exchanger 206 without transferring or mixing the gas in each current 756 and 758. For example, the exhaust may contain a substance as it follows the first current 758 through the heat exchanger 206; the plate 752 may hinder the substance from transferring to the gas following the second current 756 and may facilitate heat transfer from the exhaust to the gas. This may allow for gas to be unsaturated with the substance to enter the print system 190 and provide heat to the print system 190.

Some of the substance may have been separated from the exhaust by transferring heat between the exhaust and the gas. The removal unit 104 may be configured to transfer the substance separated from the exhaust to a container 210. The exhaust may continue to contain the substance after passing through the heat exchanger 206. The exhaust may be at a different temperature and may be more saturated with substance after passing through the heat exchanger 206.

The current 758 may flow from the heat exchanger 206 to and/or through an impaction mechanism 208. The impaction mechanism 208 may have a collection surface 748 configured to collect the substance as the exhaust flows through the collection surface 748. The collection surface 748 may include a plurality of threaded fibers to form a mesh to allow particular sized particles to pass through while larger particles may not. For example, the impaction mechanism 208 may be a demister having a mesh density based on at least one of a particle size of the substance and a viscosity of the substance. The mesh density may allow for the exhaust to pass through the impaction mechanism 208 and the substance may collide with the threads of collection surface 748 of the impaction mechanism 208. The geometry of the collection surface 748 may be based on at least one of an allowable pressure drop, an amount of exhaust in the current 758, the particle size of the substance, the viscosity of the substance, the time period at which the exhaust may spend in the impaction mechanism 208, and the determined efficiency of the removal unit 104. The substance may aggregate on the threads of the collection surface 748. The impaction mechanism 208 may impact, coalesce, and/or gather the substance. The removal unit 104 may be configured to collect the substance separated from the exhaust by the impaction mechanism 208. For example, the impaction mechanism 208 may coalesce the substance to form droplets which may drop to the bottom of the removal unit 104 towards an outlet 746 of the removal unit 104.

The impaction mechanism 208 may be supported by a support structure 750. The support structure 750 may orient the impaction mechanism 208 to pass the current 758 through the impaction mechanism 208. The support structure 750 may orient the impaction mechanism 208 to collect the substance that may have been separated from the exhaust while passing through the heat exchanger 206.

A portion of the removal unit 104 may form an outlet 740. The outlet 740 may lead from the removal unit 104 to a container 210. The portion of the removal unit 104 may guide the gathered substance towards the outlet 746. For example, the substance may be a solvent, and the substance may flow down the interior of the removal unit 104 to reach the outlet 746. The container 210 may be operatively coupled with the removal unit to collect the substance. For example, the substance may be a solvent that may gather into large enough groups to form droplets. The droplets may fall from the edge of the portion of the removal unit 104 into the container 210 placed below the removal unit 104.

Figure 8:
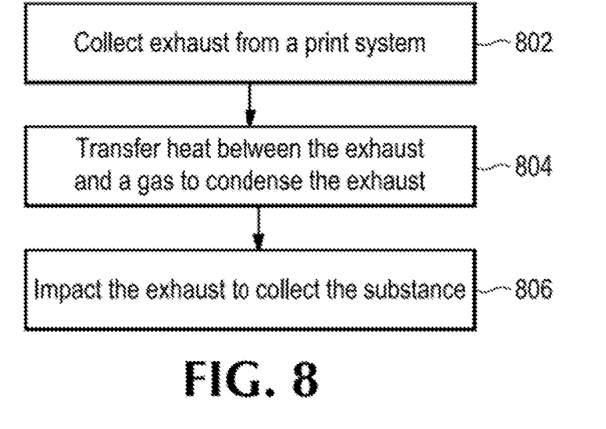
FIGS. 8 and 9 are flow diagrams depicting example methods for removing a substance from a print system.
Figure 9:
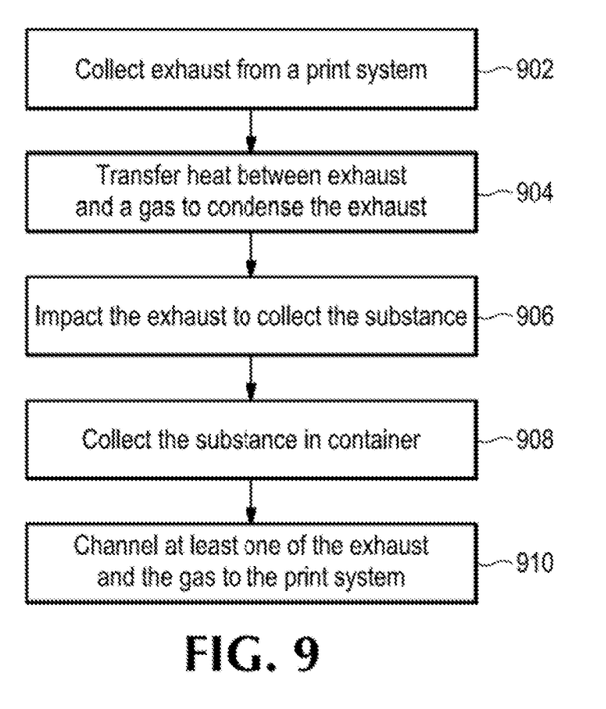

FIGS. 8 and 9 are flow diagrams depicting example methods for removing a substance from a print system. In discussing FIGS. 8 and 9, reference may be made to elements and diagrams of FIGS. 1-7 to provide contextual examples. Implementation, however, is not limited to those examples. In general, the example methods may generally comprise collecting exhaust from the print system and separating a substance from the exhaust by transferring heat between the exhaust and a gas to condense the exhaust and impacting the exhaust to collect the substance.

In block 802, a collection unit may collect exhaust from a print system. The collection unit may be operatively coupled to the print system. The exhaust may contain a substance. The substance may be separated from the exhaust at blocks 804 and 806.

The exhaust may be collected at an inhale rate based on the exhale rate of the exhaust from the print system. For example, the inhale rate may be about the exhale rate of the print system. Matching the inhale rate and exhale rate may avoid negative effects of placing a collection unit over the outlet of the print system. For example, if the inhale rate may be different from the exhale rate, the print system may use more external air in the print system or may not collect enough exhaust to avoid the negative effects of the substance in the print system. The inhale rate may be determined by setting a pattern and geometry of inlets of the collection unit to homogenize flow across the collection unit to compensate for channel characteristics of the collection unit.

In block 804, heat may be transferred between the exhaust and a gas to condense the exhaust. The heat transfer may lower temperature of the exhaust to condense the exhaust. The substance in the exhaust may condense to a size that may separate the substance from the exhaust. The exhaust may become saturated with the substance at an ambient temperature.

The heat transfer may be accomplished by a heat exchanger. The heat exchanger may be a passive heat exchanger or an active heat exchanger. Respectively, the transferring of heat may generally comprise one of passively exchanging heat of the exhaust with the gas having is passive temperature that is about the ambient temperature and actively exchanging heat of the exhaust with the gas having an active temperature that is lower than the ambient temperature.

A passive heat exchange may condense the exhaust sufficiently and may not use the energy used by an active heat exchange method.

The heat transfer may be accomplished by guiding the exhaust to follow a first current that is separate from the second current, which may contain a gas, and transferring heat from the exhaust to a plate that is located next to both the first and second currents. One or both of the currents may flow to the print system to provide heat to the print system.

In block 806, the exhaust may be impacted to collect the substance. The exhaust may be impacted by an impaction mechanism having a collection surface, such as a demister. The collection surface may have a plurality of threaded fibers having a mesh density based on the particle size of the substance and/or the viscosity of the substance. The substance may coalesce and/or aggregate on the threads of the collection surface to collect the substance. The aggregation may form droplets that may fall by gravity towards a container.

Referring to FIG. 9, the discussion and description of blocks 802, 804, and 806 may be applied to blocks 902, 904, and 900 respectively.

In block 908, the substance condensed from the heat exchanger and/or the substance collected from the impaction mechanism may be collected into a container. A removal unit may be configured to funnel the condensed and/or collected substance to the container.

In block 910, at least one of the exhaust and the gas may channel to the print system. For example, the currents flowing through the heat exchanger may both lead back to the print system. The current from the heat exchanger to the impaction mechanism may flow to the print system or to an area and/or environment external to the print system. The exhaust and/or the gas may provide heat to the print system. For example, the heat from the exhaust and/or the gas may be used to cure and/or dry the print material. Efficiency of the system may be increased by circulating the heat vented from the print system back to the print system. For example, the temperature of the circulated heat may be at a higher than an ambient temperature, and may use less energy to heat to a cure temperature than gas from outside the print system and/or substance removal system.

Although the flow diagrams of FIGS. 8 and 9 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present description has been shown and described with reference to the foregoing exemplary embodiments. It is understood, however, that other forms, details, and embodiments may be made without departing from the spirit and scope of the invention that is defined in the following claims.

What it claimed:

1. A substance removal apparatus for a print system comprising:
    a collection unit having a structure forming a channel, a portion of the structure forming an inlet to the channel to receive an exhaust from the print system, the exhaust to contain a substance; and
    a removal unit operatively coupled to the collection unit, the removal unit to separate the substance from the exhaust and transfer heat from the exhaust to the print system, the removal unit comprising:
        a heat exchanger to transfer heat from the exhaust to a gas;

an impaction mechanism to impact the exhaust and coalesce the substance;
a return channel to communicate with the print system; and
a gas movement device to generate a flow of the exhaust through the heat exchanger and through the impaction mechanism to the return channel, the return channel to pass the exhaust, after removal of the substance by the inspection mechanism, back to the print system.

2. The substance removal apparatus of claim 1, wherein the heat exchanger includes a plate to transfer heat from the exhaust to the gas, and the impaction mechanism includes a collection surface having a plurality of threaded fibers to form a mesh.

3. The substance removal apparatus of claim 2, wherein the heat exchanger is a passive plate cross-flow heat exchanger, and the impaction mechanism includes a demister having a mesh density based on at least one of a particle size of the substance and a viscosity of the substance.

4. The substance removal apparatus of claim 1, wherein the portion of the structure of the collection unit forms a plurality of inlets, each inlet of the plurality of inlets having a geometry based on at least one of a location of the each inlet of the plurality of inlets and a flow rate of the exhaust from the print system.

5. The substance removal apparatus of claim 4, further comprising a lip coupled to the collection unit, the lip to divert the exhaust from the print system to the plurality of inlets of the collection unit.

6. The substance removal apparatus of claim 1, further comprising:
an attachment mechanism coupled to the collection unit, the attachment mechanism to attach the collection unit to the print system and align the portion of the structure of the collection unit with a portion of the print system forming an outlet; and
a container coupled to the removal unit to collect the substance, the substance comprising a solvent.

7. A system comprising:
a print system to produce an exhaust having a substance;
a collection unit operatively coupled to the print system, the collection unit including a structure forming a channel to receive the exhaust from the print system;
a heat exchanger operatively coupled to the collection unit to receive the exhaust from the collection unit, the heat exchanger to condense the exhaust by transferring heat to a gas;
an impaction mechanism operatively coupled to the heat exchanger to receive a portion of the exhaust discharged from the heat exchanger, the impaction mechanism comprising a mesh of fibers to remove the substance from the portion of the exhaust, to form an output exhaust;
a return channel between the impaction mechanism and the print system; and
a gas movement device to cause the exhaust to flow through the heat exchanger, the portion of the exhaust to flow into the impaction mechanism from the heat exchanger, and the output exhaust to flow into the return channel to return the output exhaust to the print system.

8. The system of claim 7, wherein the heat exchanger comprises a plate to transfer the heat from the exhaust to the gas to cause the exhaust to decrease in temperature.

9. The system of claim 7, wherein the structure of the collection unit comprises a plurality of inlets to receive the exhaust from the print system, the plurality of inlets arranged along the collection unit and progressively growing in size from a first end of the collection unit to a second end of the collection unit.

10. The system of claim 7, further comprising a second gas movement device to cause a flow of the gas through the heat exchanger in a direction that is angled with respect to a direction of the flow of the exhaust through the heat exchanger.

11. A method comprising:
collecting exhaust from a print system by a collection unit operatively coupled to the print system, the exhaust containing a substance; and
separating the substance from the exhaust by:
transferring, by a heat exchanger, heat between the exhaust and a gas to condense the exhaust;
impacting the exhaust from the heat exchanger on an impaction mechanism to collect the substance; and
using a gas movement device, flowing the exhaust from the collection unit to the heat exchanger, flowing the exhaust from the heat exchanger to the impaction mechanism, and flowing the exhaust after removal of the substance by the impaction mechanism to a return channel to return the exhaust to the print system.

12. The method of claim 11, wherein collecting the exhaust from the print system comprises collecting the exhaust at an inhale rate based on an exhale rate of the exhaust from the print system.

13. The method of claim 11, wherein transferring the heat is performed by the heat exchanger that is one of a passive heat exchanger or an active heat exchanger.

14. The substance removal apparatus of claim 1, wherein the passing of the exhaust back to the print system causes transfer of heat of the exhaust, after passing through the impaction mechanism, to the print system for reuse of the heat in the print system.

15. The substance removal apparatus of claim 1, wherein the gas movement device is to cause the exhaust to pass through the heat exchanger to cool the exhaust, and to cause the cooled exhaust to pass through the impaction mechanism to remove the substance.

16. The substance removal apparatus of claim 1, wherein the heat exchanger is a cross-flow heat exchanger, and the removal unit further comprising a second gas movement device to cause a flow of the gas in a first direction, and wherein the flow of the exhaust through the heat exchanger is in a second direction that is angled with respect to the first direction.

17. The substance removal apparatus of claim 16, wherein the heat exchanger comprises a heat exchange plate between the flow of the gas and the flow of the exhaust.

18. The system of claim 7, wherein the return of the output exhaust to the print system causes transfer of heat of the output exhaust for reuse in the print system.

19. The method of claim 11, wherein the return of the exhaust to the print system causes heat of the exhaust to be returned to the print system for reuse by the print system.

* * * * *